United States Patent
Lenoir et al.

(10) Patent No.: US 6,915,556 B2
(45) Date of Patent: Jul. 12, 2005

(54) METHOD FOR ASSEMBLING CONDUCTIVE SEGMENTS OF A ROTOR WINDING OR STATOR WINDING IN A ROTARY ELECTRIC MACHINE

(75) Inventors: Romaric Lenoir, Neufchatel-Hardelot (FR); Sébastien Arrighi, Versailles (FR); Denis Even, Paris (FR); Thierry Hevia, Le Touquet (FR)

(73) Assignee: Valeo Equipements Electriques Moteur, Creteil (FR)

( * ) Notice: Subject to any disclaimer, the term of this patent is extended or adjusted under 35 U.S.C. 154(b) by 190 days.

(21) Appl. No.: 10/240,943

(22) PCT Filed: Feb. 28, 2002

(86) PCT No.: PCT/FR02/00719

§ 371 (c)(1),
(2), (4) Date: Feb. 5, 2003

(87) PCT Pub. No.: WO02/069472

PCT Pub. Date: Sep. 6, 2002

(65) Prior Publication Data

US 2003/0159269 A1 Aug. 28, 2003

(30) Foreign Application Priority Data

Feb. 28, 2001 (FR) .............................................. 01 02735

(51) Int. Cl.[7] ........................ H02K 15/00; H02K 15/14; H02K 15/16
(52) U.S. Cl. ............................. 29/596; 29/597; 29/598; 29/605; 29/732; 219/75; 219/125.11; 310/42; 310/201
(58) Field of Search .......................... 29/596, 597, 598, 29/605, 732; 219/75, 125.11; 310/42, 201

(56) References Cited

U.S. PATENT DOCUMENTS

| 5,113,574 | A | | 5/1992 | Nuss | |
|---|---|---|---|---|---|
| 6,403,921 | B1 | * | 6/2002 | Maeda et al. | 219/125.11 |
| 6,459,177 | B1 | * | 10/2002 | Nakamura et al. | 310/42 |
| 6,490,779 | B1 | * | 12/2002 | Tokizawa et al. | 29/596 |

FOREIGN PATENT DOCUMENTS

| EP | 1 081 830 A2 | 3/2001 |
|---|---|---|
| JP | A 2001-54263 | 2/2001 |
| WO | WO 88/09080 | 11/1988 |

* cited by examiner

Primary Examiner—Carl J. Arbes
Assistant Examiner—Tim Phan
(74) Attorney, Agent, or Firm—Liniak, Berenato and White

(57) ABSTRACT

This process for assembling conductive segments (16) of a rotor or stator winding of a rotary electrical machine comprises the stages consisting in inserting the conductive segments (16) in slots arranged in a core (12) of the rotor or of the stator in such a way that the conductive segments project beyond the latter by their free ends, and in welding the conductive segments in pairs by their projecting free ends to form a winding (14) around the rotor or the stator.

The conductive segments each being formed by a wire of electrically conductive material covered with a layer of electrically insulating material, the layer of electrically insulating material is eliminated, in the zone in which the conductive segments are welded, by the means used to weld the latter.

Application to the assembly of conductive segments of a rotor or stator winding of a motor-vehicle alternator.

6 Claims, 3 Drawing Sheets

US 6,915,556 B2

METHOD FOR ASSEMBLING CONDUCTIVE SEGMENTS OF A ROTOR WINDING OR STATOR WINDING IN A ROTARY ELECTRIC MACHINE

This application is the U.S. National Phase under 35 U.S.C. 371 of International Application PCT/FR02/00719, filed Feb. 28, 2002.

FIELD OF THE INVENTION

The present invention relates to a process for assembling conductive segments of a rotor or stator winding of a rotary electrical machine.

More particularly, the invention concerns a process for assembling conductive segments of a rotor or stator winding of a motor-vehicle alternator.

PRIOR ART

In a conventional configuration, the stator windings of a motor-vehicle alternator are formed by using pre-formed conductive winding segments in the form of a U, which are inserted, by their base, into slots formed in a core of the stator in such a way that the mutually opposite free-end zones of the conductive segments project beyond the latter, and by welding the conductive segments in pairs to form continuous wound components around the core.

An assembly technique of this kind is described, for example, in the document EP-A-1 043 828. According to this technique, the conductive segments are generally welded using arc-type welding, e.g. of the TIG type, by creating a discharge between an electrode and the respective free end zones of the segments.

Since the conductive segments are generally formed by a wire of electrically conductive material, e.g. copper, covered by a layer of electrically insulating material, e.g. enamel, it is often desirable to protect the insulating covering from the heat released during welding. To this end, use is generally made of a striking voltage that varies intermittently, such that the arcs produced by the voltage pulses are applied in respective zones of the welding zones. This limits the quantity of heat released outside the welding zones. Since this technique gives rise to uncontrolled transient states during the striking of the arcs, the use of a protection element inserted between two end zones of two adjacent segments to be welded in such a way as to protect the rest of the conductive segments has been proposed.

Thus, according to the technique described in the above-mentioned document, a protective chuck gripping the conductive elements to be welded in such a way that, on the one hand, the heat released during welding does not spoil the layer of electrically insulating material between the welding zones and, on the other hand, the heat is conducted towards zones that are to be welded so as to produce preliminary preheating.

However, this technique has one major disadvantage, inasmuch as it requires preliminary stripping of the free ends of the conductive segments to be welded, considerably increasing the costs of production, and is difficult to envisage in high-speed production lines inasmuch as the stripping operation takes a relatively long time.

Moreover, when the stripping stage is performed mechanically, in order to completely remove the layer of electrically insulating material, the peripheral surface of the conductive wire is inevitably cut, leading to a reduction in the useful cross section of the conductive segments.

OBJECT OF THE INVENTION

The aim of the invention is to overcome these disadvantages.

Its object is therefore a process for assembling conductive segments of a rotor or stator winding of a rotary electrical machine, comprising the stages consisting in:

inserting the conductive segments in slots arranged in a core of the rotor or of the stator in such a way that the segments project beyond the latter by their free ends, folding the free ends of the conductive segments, and welding the conductive segments in pairs by their projecting free ends to form a winding around the rotor or the stator, essentially characterised in that, the conductive segments each being formed by a wire of electrically conductive material covered with a layer of electrically insulating material, the layer of electrically insulating material is eliminated, in the zone in which the conductive segments are welded, by the means used to weld the latter.

It is thus no longer necessary to provide a preliminary stripping stage, such as, for example, mechanical stripping of the layer of electrically insulating material. Moreover, the outlay incurred for the assembly of the segments is considerably reduced. The solution is thus rapid, simple and economical.

Surprisingly, it has furthermore been found that when the welding process used is a welding process of the electron-beam or laser type, welds of very high quality can be achieved without carrying out preliminary stripping of the conductive segments or welding in the presence of residues of electrically insulating materials when a preliminary stage of partial stripping is implemented, that is to say without spoiling the conductive wire.

This assembly process can likewise include one or more of the following characteristics, taken in isolation or in any of the technically possible combinations:

the stage in which the layer of electrically insulating material is eliminated is carried out during the welding of the conductive segments;

following the welding of the conductive segments, a stage in which debris of electrically insulating material produced during welding is removed is carried out;

the stage of removing debris includes a phase in which the welded zones are brushed, followed by a suction phase;

the welding process is a welding process of the electron-beam type;

the general axis of the electron beam is inclined by about 45° to the axis of the rotor or of the stator.

in the course of welding, the electron beam has imparted to it a sweeping motion over the entire welding zone.

the welding process is an accurate and rapid laser-welding process which makes it possible to obtain penetrating seams of high geometrical accuracy.

the welding means is driven in a sequential manner; the laser beam being switched on and then off alternately between each welding operation.

BRIEF DESCRIPTION OF THE DRAWINGS

Other aims, characteristics and advantages of the invention will emerge from the following description, which is given purely by way of example, with reference to the attached drawings, in which.

PREFERRED EMBODIMENT EXAMPLES OF THE INVENTION

Figure 1:
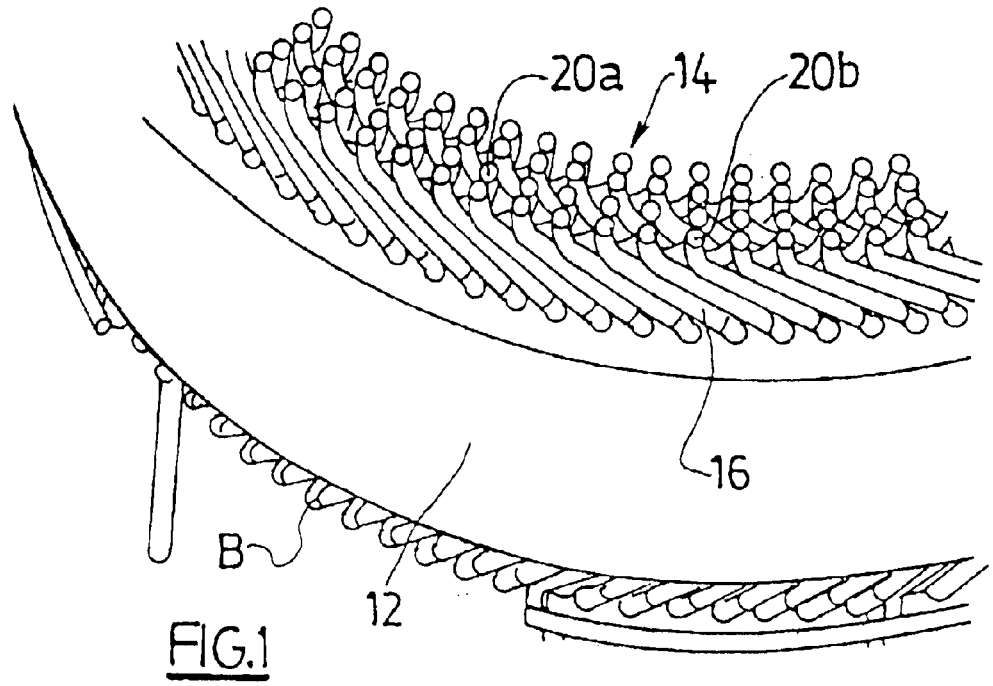
FIG. 1 is a perspective view of a portion of a stator of a motor-vehicle alternator provided with a winding produced in accordance with the invention.

In the explanation which follows, the assembly of a stator winding of a motor-vehicle alternator will be described. However, the invention also applies, where appropriate, to the assembly of a rotor winding of an alternator and, in a general way, to the assembly of a rotor or a stator of a rotary electrical machine.

As is known, a conventional motor-vehicle alternator includes a rotor firmly fixed to a rotor shaft, the axial ends of which are supported in rotation by a hollow support designed to be mounted on a fixed part of the motor vehicle. On the inside, at its outer periphery, this support carries a stator, described below, surrounding the rotor. In this alternator, the rotor is shaped to form an inductor, while the stator is shaped to form an armature.

The support includes two parts, referred to respectively as a front bearing and a rear bearing. Each bearing features a central receptacle for mounting a ball bearing, in which the relevant end of the rotor shaft is mounted. This shaft extends outside the front bearing in order to support a drive member, conventionally a pulley, for driving the rotor in rotation by means of the heat engine of the vehicle, via a motion transmission device conventionally including at least one belt. As described, for example, in the document FR-A-2 806 224, filed on Sep. 3, 2001, the alternator can be of the reversible type and can form a starter for the motor vehicle, such that the rotor can likewise drive the rotor shaft and the drive member in rotation so as, in particular, to start the heat engine of the motor vehicle.

The rear bearing carries a brush holder linked electrically to a voltage regulator. In certain embodiments, the rear bearing likewise carries a rectifier device, such as diodes or transistors of the MOSFET type, in order to rectify the alternating current produced in the winding 14 of the stator described below.

In a variant, the rectifier device is at a distance from the rear bearing, as described in the document FR-A-2 806 224.

The brushes of the brush holder are intended to co-operate with collector rings supported by the rear end of the rotor shaft. These rings are linked to the ends of at least one excitation winding of the rotor. In the document FR-A-2 806 224 mentioned above, an excitation winding is provided, and the rotor is of the claw type, that is to say of the type featuring two toothed pole wheels defining magnetic poles when the excitation winding is supplied with electric current. In a variant, permanent magnets are mounted between the axially oriented teeth to increase the magnetic excitation flux.

In a variant, the rotor has salient poles, as described, for example, in the document PCT/FR02/00037 filed on May 1, 2002, such that a plurality of excitation windings are provided.

In one embodiment, the alternator is water-cooled; its support including a passage for the circulation of a cooling fluid such as the cooling liquid of the heat engine of the motor vehicle.

In a variant, the alternator is air-cooled in a known manner; the rotor preferably carrying an internal fan at at least one of its axial ends, the fan producing a radial and/or axial flow and being arranged within the support for circulation of the air as shown in the two above-mentioned documents FR-A-2 806 224 and PCT/FR02/00037. Reference should be made to these documents for more details.

A fan is preferably provided at each end of the rotor.

In all cases, the front and rear bearings have openings for air circulation.

In a variant, in the case where the alternator is water-cooled, the rotor can be provided with at least one fan producing an axial flow.

Figure 2:
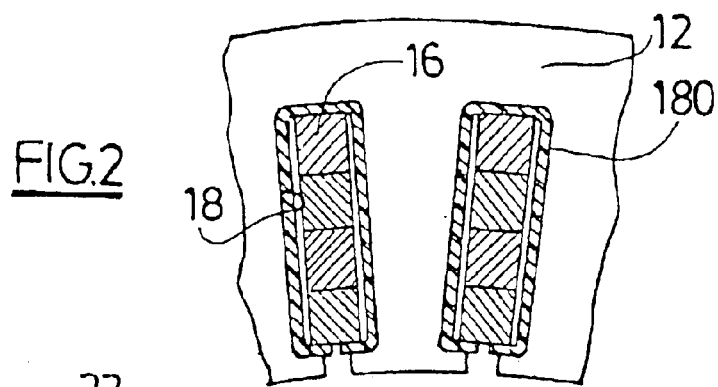
FIG. 2 is a cross section through a portion of the stator in FIG. 1.

Referring to FIGS. 1 and 2, it will be seen that the stator for a multi-phase motor-vehicle alternator essentially includes a core 12 supporting a winding 14 formed by an assembly of electrically conductive segments, such as 16. This type of winding is referred to as bar windings. The core 12 is supported by the support of the alternator at the outer periphery of the latter, possibly with elastic elements in between, as described in the document FR-A-2 806 224.

In a conventional manner, the core 12 is produced from cylindrical metal sheets and is provided with slots or notches, such as 18, distributed in a regular arrangement along the periphery of the core 12 and in each of which a conductive segment 16 is inserted with an electrical insulator 180, e.g. a mica-based insulator, inserted in a known manner between the segments and the edges of the slots 18. In this case, the slots 18 are of the semi-closed type and open out at the inner periphery of the core 12 by way of an opening whose width is less than that of the slots. In a variant, the slots are of the closed type.

Each conductive segment 16 has the general form of a U, the base B of which projects from one of the large faces of the core 12 and the branches of which are each inserted into a respective notch 18 in such a way that their free ends project beyond the other large face of the core 12 of the stator, as can be seen in FIG. 1. These free ends are referred to as buns and are arranged at right angles to the fans so as to be well cooled by circulation of the air, as can be seen, for example, in the documents EP-A-1 043 828 and FR-A-2 806 224 mentioned above.

More particularly, and as shown in FIG. 1, for example, two branches 20-*a* and 20-*b* of the same winding segment 16 are inserted into two notches 18 remote from a predetermined number of notches, in which branches of adjacent conductive segments are inserted.

FIG. 1 likewise shows one of the outputs of the phases. For more details, reference should be made to the document PCT/FR01/04147 filed on Dec. 21, 2001.

As can be seen in FIG. 2, each conductive segment has a generally rectangular cross section and is covered with an electrically insulating layer to ensure that the segments are electrically insulated from each other in the slots 18.

One of the branches 20-a of each segment 16 is inserted into a radially inner portion of a respective slot 18, the other branch 20-b being inserted into a radially outer portion of another respective slot 18 to form at least two radially superposed layers per slot. In this case, assembly is achieved by threading the branches 20-a, 20-b axially into the slots. In a variant, assembly is achieved by threading the said branches radially into open slots converted into semi-closed slots after the placement of the conductive segments (of the bars) by folding over material, as described in the document FR-A-631 056.

As will be seen in FIG. 1, once all the conductive segments 16 of the stator 16 have been fitted, all the slots 18 are provided with branches of conductive segments 16. This stage of mounting the conductive segments on the core 12 is followed by a stage in which the free ends of the conductive segments are folded in such a way, for example, that the free ends of the conductive segments situated in a radially outer position are folded clockwise, when considering the direction of rotation of the rotor, and the end zones of the conductive segments in a radially inner position are folded anticlockwise. These free ends are preferably folded at an angle of 45° relative to the general axis of the rotor.

To carry out this operation, for example, use is made of rotary turrets provided with gripping notches, each intended to receive one free end of a conductive segment, each turret being used to fold a conductive segment assembly, either in the clockwise or the anticlockwise direction.

After this assembly and this folding stage have been carried out, the mutually opposite free ends of branches situated in the same slot 18 are welded, as is conventional, in such a way as to form a continuous winding around the stator.

In the embodiment example shown in FIGS. 1 and 2, the stator is arranged in such a way as to be provided with four conductive-segment branches for each slot 18, forming on the outside of the body 12 two pairs of free ends 22 and 24 of conductive segments 16 spaced apart from each other with a view to being welded.

The arrangements described in the document PCT/FR01/04147 mentioned above can be adopted.

Of course, the invention likewise applies to any other arrangement according to which the slots are each provided with an arbitrary number of conductive-segment branches, e.g. two conductive-segment branches, depending on the number of turns and of phases to be obtained.

For example, the conductive segments are produced from an electrically conductive copper wire covered with an electrically insulating layer of enamel.

To produce a continuous winding along the periphery of the core 12, the facing free ends 22 and 24 of the conductive segments are welded to one another. To do this, a contactless welding process is used, preferably a welding process of the electron-beam type or preferably a laser welding process.

These welding techniques are known per se. They will therefore not be described in detail below.

However, it will be noted that these welding techniques make it possible to achieve effective welding without carrying out a preliminary stage of stripping the corresponding free ends of the conductive segments, the layer of electrically insulating material covering the wire of electrically conductive material being denatured in the course of the welding process proper, under the action of the heat generated by the welding means used, leading to fusion of the metal.

Figure 3:
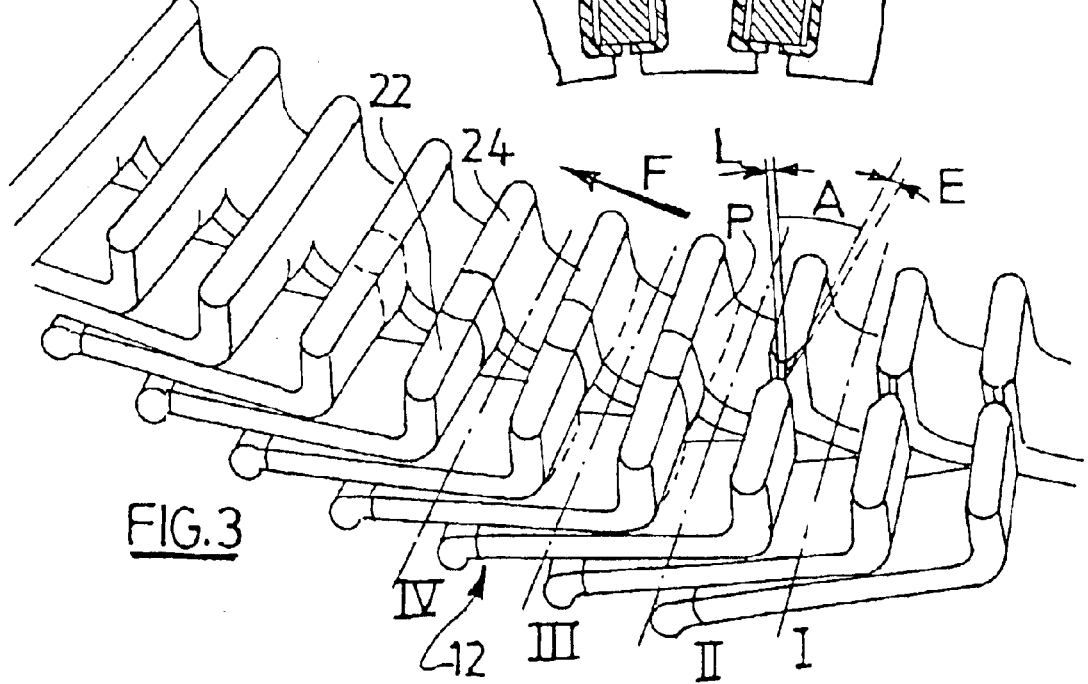
FIG. 3 is a schematic view of the stator in FIG. 1 on a larger scale.

As can be seen in FIG. 3, in one embodiment, in the case where a laser beam L is used, the said beam extends parallel to the facing free-end zones of the conductive segments 22 and 24 to be welded, that is to say parallel to the axial axis of symmetry of the stator.

Figure 4:
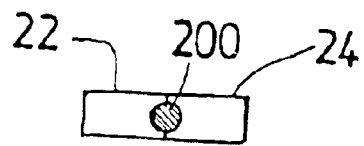
FIG. 4 is a view of the point of impact of the laser beam on the free ends to be welded of the conductive segments.

FIG. 4 shows the point of impact 200 of the laser beam on the free ends to be welded of the conductive segments.

Here, this point of impact is circular overall.

In a variant, by contrast, when an electron beam E is used, shown in the form of dots in this figure, the beam is preferably inclined at an angle A of around 45° relative to the axis of the stator.

Figure 10:
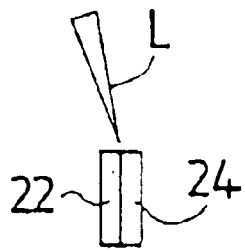
FIG. 10 is a variant of FIG. 3 corresponding to a third embodiment example of the invention, showing in plan view the path of the laser beam relative to the ends to be welded.
Figure 11:
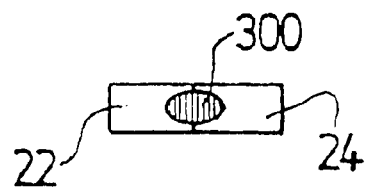
FIG. 11 is a view similar to FIG. 4 of the third embodiment example in FIG. 10.

It is, of course, possible to incline the laser beam as shown schematically in FIG. 10 relative to the axial axis of the stator, the point of impact 300, which is then oblong in shape, being shown in FIG. 11.

This inclination makes it possible to increase the tolerances of the process.

In these different embodiments, the laser or electron beam produced can be either continuous or discontinuous.

As for the stator 12, it is driven in rotation in accordance with the arrow F in such a way as to successively present to the welding means used each of the conductive-segment ends to be welded.

Thus, in the course of the rotation of the stator 12, four zones may be distinguished in the stator, these being designated respectively by the references I, II, III and IV in FIG. 3, each of which corresponds to a specific phase of the process for assembling segments.

Zone I corresponds to an unwelded zone. The free ends 22 and 24 of the conductive segments are then in an unstripped form and are consequently each made up of a wire of electrically conductive material covered with a layer of electrically insulating materials.

During the following phase II, two adjacent ends, which are in contact here, of conductive segments are situated opposite a welding means and are subjected to the action of the laser or electron beam used.

As mentioned above, the beam can be either continuous or intermittent. When the beam is an electron beam, it can be continuous. When using a laser beam, however, the laser is preferably driven in such a way that its operation is sequential and coincides with the stepwise rotation of the stator 12. More precisely, the laser is fired precisely and rapidly in a rhythmical manner without the need to operate in a vacuum, as in the case of electron beam welding, or in an inert gas, as in the case of TIG-type welding, which make it necessary to ensure a flow of current between an electrode and the free ends of the conductive segments to be assembled and hence to remove the electrical installation in advance.

During welding, the laser beam is fixed relative to the core 12 fitted with the facing free ends 22 and 24 of the electrically conductive segments to be welded, this being the optimum for apportioning, in particular by acting on the duration, and concentrating the energy of the beam without the need to preheat and strip the facing free ends 22 and 24. Moreover, this minimises the distance over which the enamel on the ends 22 and 24 is modified by the heat of the welding process.

This laser welding process thus makes it possible to obtain welds of good quality and good geometry.

The laser welding process is preferably carried out in a pulsed manner, making it possible to quantify precisely the energy used for each weld.

This control of the energy makes it possible to ensure perfect reproducibility of the geometry of the joints between the ends 22 and 24 without using any other related means.

In this case, the laser pulses last for 0.05 to 0.06 seconds, for example. The core 12 fitted with the conductive segments is then turned, during which process the laser is inactive.

In other words, the welding means, in this case of the laser type, is driven in a sequential manner, the beam being turned on during welding, then turned off between each weld.

It will likewise be noted that, in the case where an electron beam is used, it has imparted to it a sweeping motion in such a way as to irradiate the entire welding zone delimited by the facing edges of the free ends of the conductive segments.

In the course of phase II, that of welding proper, the layer of electrically insulating material, in this case enamel, is denatured by burning. After welding (phase III), a film P made up of denatured enamel debris is thus formed in a zone subjected to the heat released by the welding means. The height of this film is relatively small, corresponding substantially to the welding zone, the remainder of the electrically insulating layer remaining intact.

In the course of the final phase IV, this film P is removed by any appropriate means, for example by brushing followed by a suction phase.

A current of air is advantageously ensured between the conductive segments of the stator below the welds to make it possible to avoid contamination of the conductive segments by welding residues. This current of air limits the risks of a short circuit.

In another embodiment (FIGS. 5 to 9), the free ends to be welded 22 and 24 have a necked shape, as described in the document DE-A-37 04 780. In this case, these ends 22 and 24 each have an angled chamfer 124 of between 45° and 55° (45 °±10°) and a flat edge 125 with a width of between 25% and 50% of the width of the segments 16; the faces of the ends 22 and 24 which are intended to come into contact being without a chamfer. These chamfers make it possible in a known manner to introduce the conductive segments easily into the slots 18.

Good results have been obtained for unstripped segments 16 with a width equal to at least 2 mm, the enamel having a stabilising effect. The chamfers promote welding because this makes it possible to localise the heat more effectively.

Weld seams 126 of the penetrating type with an inner triangle which, in this case, has a base equal to the width of a segment 16 and a height equal to 50% of the width of the wire are obtained. The point of the triangle extends axially further inwards than the chamfers 124.

Figure 8:
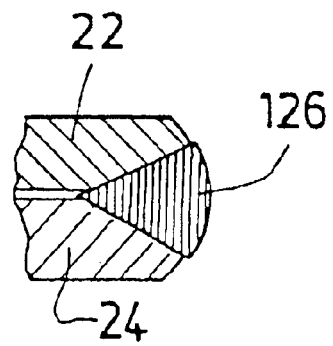
FIG. 8 is a view similar to FIG. 7 after welding.

As can be seen in FIG. 8, there is a clearance between the two ends after welding, this clearance stemming from the modification (stripping) of the enamel during welding leading to fusion of the metal. By shortening the welding time, it is possible to obtain a weld seam of the type shown in FIG. 12, i.e. a shallower penetrating weld.

Figure 12:
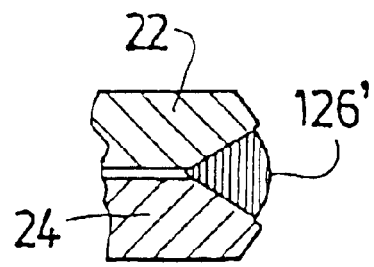
FIG. 12 is a view similar to FIG. 8 of a fourth embodiment example of the invention.

In this FIG. 12, a clearance due to the modification of the enamel during welding has likewise been shown.

The seam 126' of FIG. 12 does not project relative to the conductive segments.

Figure 9:
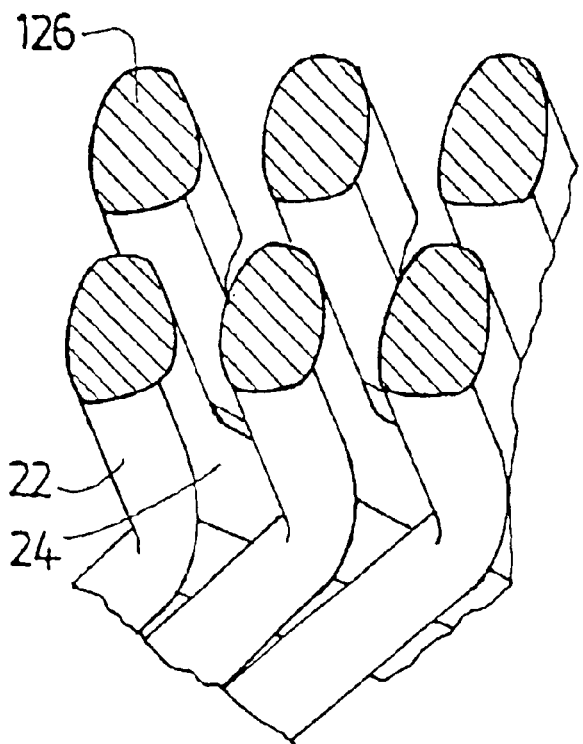
FIG. 9 is a partial perspective view of the welded ends of the second embodiment example.

In all cases, these seams 126, 126' are not very thick, as can be seen more clearly in FIG. 9, such that there is no risk of any short-circuiting. Circulation of air is thus promoted at the level of the seams.

The assembly process is economical in relation to the process described in the document EP-A-1 081 831, necessitating displacement of the ends to be welded relative to an electric arc in order to align the welds.

In this case, no relative movement at all is necessary by virtue of the formation of penetrating weld seams. This promotes the cooling of the winding 14.

In fact, a fan is installed in the above-mentioned manner radially below the thin welded ends 22 and 24, such that the structure of these seams promotes the passage of air and hence good cooling of the alternator and a reduction in noise.

The alternator, which in this case is of the multi-phase type, can thus be very powerful.

Figure 6:
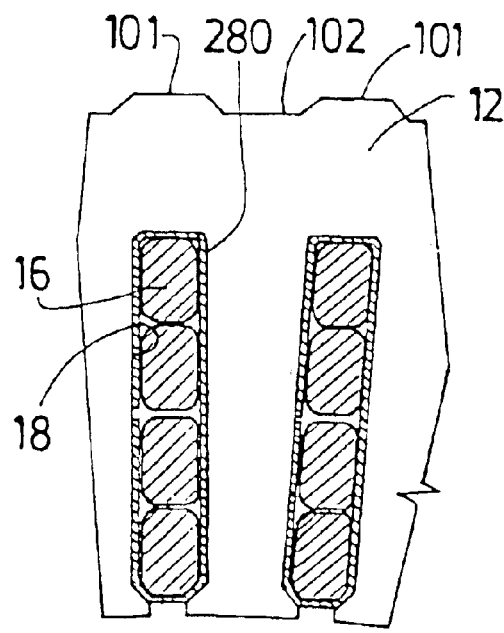
Figure 7:
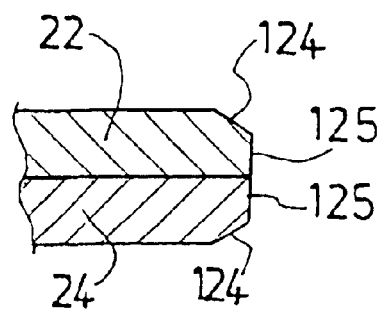
FIG. 7 is a partial plan view of the conductive-segment ends to be welded in this second embodiment example.

It will be noted that the edges of the segments 16 are rounded here, as can be seen more clearly in FIG. 6, in such a way that this promotes welding.

In the embodiment in FIGS. 5 to 9, the electrical insulation 280 positioned between the edges of the slots 18 and the conductive segments 16 is open, as shown in FIG. 2, but are [sic] opening is adjacent to one of the lateral edges of the slot 18 in such a way that the inner opening of the slot 18 is closed by the insulator 280, in contrast to the embodiment in FIG. 2. This improves leaktightness.

In the embodiment in FIGS. 5 to 9, the outer periphery of the body 18 is grooved, thus forming teeth 101, in this case trapezoidal in shape, separated by notches 102. The teeth 101 face the slots 18. These arrangements promote the cooling of the stator while at the same time leading to a saving of material during the production of the body 12. The body can be formed by winding a strip of material or by forming strips of material, which are bent round. In this embodiment, the edges of the segments are more rounded than in the embodiment in FIGS. 1 to 3.

In one embodiment, the rectangular overall cross section of the segments is, of course, square overall.

The conductive segments are here mechanically in contact in a slot at the level of their width. The reverse is possible, all depending on the circumferential spacing between two consecutive slots 18.

The present invention is, of course, not limited to the embodiment examples described.

Thus, in the above-mentioned manner, the assembly process according to the invention is applicable to the rotor of the alternator, e.g. to an alternator belonging to an electromagnetic retarder of the type described in the document FR-A-2 627 913. In this case, the stator is traversed by the rotary shaft to be braked, while the rotor is firmly fixed in rotation to the shaft.

The stator then forms the inductor of the machine, and the rotor forms the armature of the machine, the winding of the rotor with conductive segments being rectified by an appropriate rectifier bridge before being applied to the coils of the retarder, as can be seen in FIG. 2 of the document FR-A-2 627 913.

Figure 13:
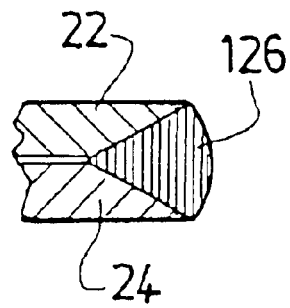
FIGS. 13 and 14 are views similar to FIG. 8 of a fifth and a sixth embodiment example of the invention, respectively.
Figure 14:
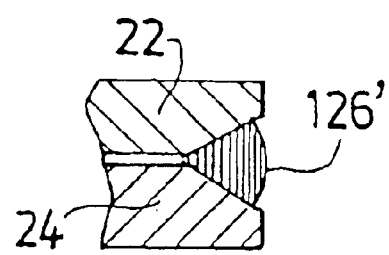

As can be seen in FIGS. 13 and 14, which correspond respectively to FIGS. 8 and 12, the presence of the chamfers 124 is not obligatory.

As a variant, it is, of course, possible, instead of using U-shaped conductive segments, to use two segments, each corresponding to one branch of the U, welded together to form a U again.

In this case, each bun of the winding 14 includes welds. The two branches of the U may, of course, not be symmetrical. For example, the arrangements described in the document U.S. Pat. No. 2,407,935 can be adopted, the connection rings being replaced by welds according to the invention.

Figure 5:
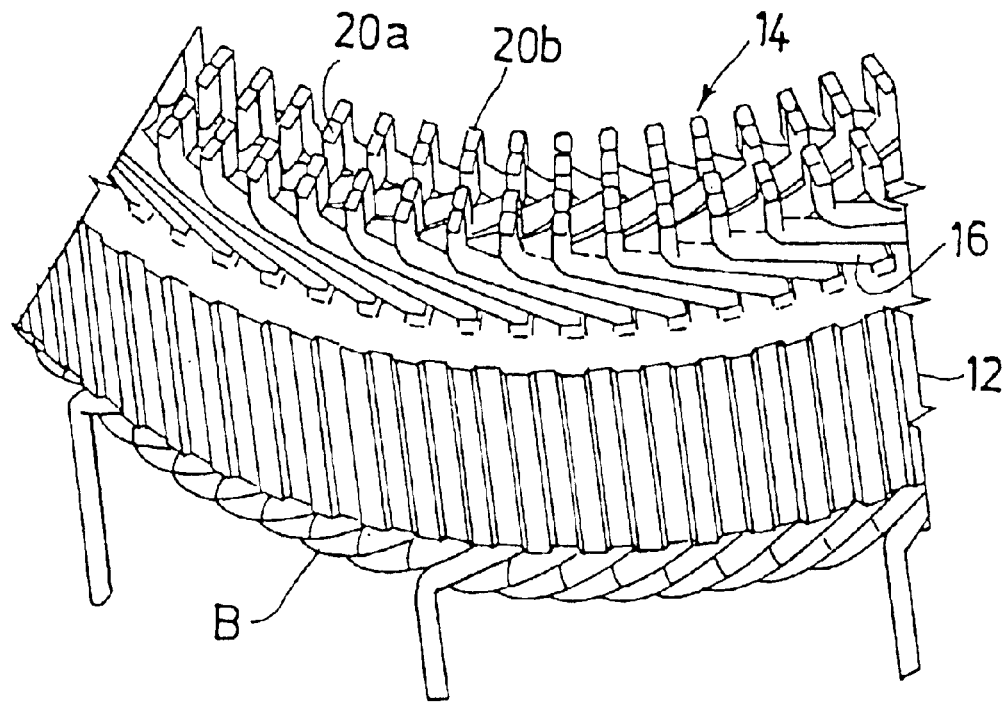
FIGS. 5 and 6 are views similar to FIGS. 1 and 2 respectively of a second embodiment example.

In FIGS. 1 and 5, the base B of the segments 16 belongs to the closest bun of the stator to the rear bearing of the support. The structures can be reversed, the base then being closer to the front bearing.

What is claimed is:

1. Process for assembling conductive segments (16) of a rotor or stator winding of a rotary electrical machine, comprising the stages of:

inserting the conductive segments (16) in slots (18) arranged in a core (12) of the rotor or of the stator in such a way that the segments project beyond the latter by their free ends, folding the free ends of the conductive segments, and during a welding operation, welding by means of a laser beam the conductive segments (16) in pairs by their projecting free ends to form a winding around the rotor or the stator, wherein, the conductive segments each being formed by a wire of electrically conductive material covered with a layer of electrically insulating material, the layer of electrically insulating material is eliminated, in the zone in which the conductive segments are welded, by the means used to weld the latter and wherein the laser beam is driven in a sequential manner, said laser beam being interrupted between two welding operations.

2. Assembly process according to claim 1, wherein the stage in which the layer of electrically insulating material is eliminated is carried out during the welding of the conductive segments (16).

3. Assembly process according to claim 2, further comprising, following the welding of the conductive segments, a stage in which debris of electrically insulating material produced during welding is removed.

4. Assembly process according to claim 3, wherein the stage of removing debris includes a phase in which the welded zones are brushed, followed by a suction phase.

5. Process according to claim 1, wherein during the welding operation the laser beam is fixed relative to the free ends (22 and 24) to be welded of the conductive segments.

6. Process according to claim 5, wherein the free ends (22 and 24) to be welded have a chamfer for the formation of a penetrating weld seam forming an inner triangle.

* * * * *